United States Patent
Provenza

(10) Patent No.: US 11,780,586 B2
(45) Date of Patent: Oct. 10, 2023

(54) ADAPTIVE FORCE VEHICLE AIRBAG SYSTEM

(71) Applicant: US Gov't as represented by Secretary of Air Force, Wright-Patterson AFB, OH (US)

(72) Inventor: Jerry Provenza, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 400 days.

(21) Appl. No.: 17/009,079

(22) Filed: Sep. 1, 2020

(65) Prior Publication Data

US 2021/0114733 A1    Apr. 22, 2021

Related U.S. Application Data

(60) Provisional application No. 62/924,320, filed on Oct. 22, 2019.

(51) Int. Cl.
*B64D 11/06* (2006.01)
*B60R 21/00* (2006.01)
(Continued)

(52) U.S. Cl.
CPC ...... *B64D 11/0621* (2014.12); *B60R 21/0132* (2013.01); *B60R 21/0136* (2013.01);
(Continued)

(58) Field of Classification Search
CPC ............ B64D 11/0621; B64D 2201/00; B60R 2021/0093; B60R 2021/01013;
(Continued)

(56) References Cited

U.S. PATENT DOCUMENTS

| | | | |
|---|---|---|---|
| 2008/0147278 A1* | 6/2008 | Breed | B60R 21/231 701/45 |
| 2016/0304004 A1* | 10/2016 | Sandbothe | B60R 21/013 |
| 2020/0290549 A1* | 9/2020 | Buice | B60R 21/217 |

FOREIGN PATENT DOCUMENTS

DE    102007057301 B4 *  6/2022   ............ B60R 21/26

OTHER PUBLICATIONS

Waldt, DE-102007057301-B4 (Year: 2022).*
(Continued)

*Primary Examiner* — Jason D Shanske
*Assistant Examiner* — Matthew James O'Neill
(74) *Attorney, Agent, or Firm* — AFMCLO/JAZ; Richard M. Mescher

(57) ABSTRACT

An adaptive force vehicle airbag (AFVA) system includes airbag(s) stowed in a compressed state within an interior of a vehicle. An impact sensor detects a change in motion of the vehicle indicative of a collision. Selectable force gas generator(s) (SFGGs) gas-generating propellant cells that are individually fired. The SFGGs have conduit(s) that receive gas from fired gas-generating propellant cells and direct the gas to inflate at least one of the airbag(s). A controller is communicatively coupled to the inflation initiating component and the gas-generating propellant cells of the SFGGs. The controller enables the AFVA system to: (i) receive an inflation signal from the impact sensor; and (ii) fire a selected number of the gas-generating propellant cells to at least partially inflate the at least one airbag.

20 Claims, 6 Drawing Sheets

(51) Int. Cl.
  *B60R 21/01*       (2006.01)
  *B60R 21/0132*     (2006.01)
  *B60R 21/0136*     (2006.01)
  *B60R 21/203*      (2006.01)
  *B60R 21/207*      (2006.01)
  *B60R 21/231*      (2011.01)
  *B60R 21/26*       (2011.01)
  *B60R 21/015*      (2006.01)

(52) U.S. Cl.
  CPC ....... *B60R 21/01516* (2014.10); *B60R 21/203* (2013.01); *B60R 21/207* (2013.01); *B60R 21/231* (2013.01); *B60R 21/26* (2013.01); *B60R 2021/0093* (2013.01); *B60R 2021/01013* (2013.01); *B60R 2021/01231* (2013.01); *B60R 2021/2078* (2013.01); *B60R 2021/23107* (2013.01); *B64D 2201/00* (2013.01)

(58) Field of Classification Search
  CPC .... B60R 2021/1231; B60R 2021/2078; B60R 2021/23107; B60R 2021/00; B60R 21/01516; B60R 21/0132; B60R 21/0136; B60R 21/203; B60R 21/207; B60R 21/231; B60R 21/26
  See application file for complete search history.

(56)         References Cited

OTHER PUBLICATIONS

Toyota, "SRS Airbags," Land Cruiser Owners and Service Manuals, available at https://www.tlacruiser.com/srs_airbags-27.html, dated before Oct. 17, 2019, 12 pages total.

* cited by examiner

ADAPTIVE FORCE VEHICLE AIRBAG SYSTEM

CROSS-REFERENCE TO RELATED APPLICATIONS

The present application claims the benefit under 35 USC § 119 of U.S. Provisional Application Ser. No. 62/924,320 filed 22 Oct. 2019 entitled "Adaptive Force Vehicle Airbag", now expired. The contents of which is incorporated herein by reference in its entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to vehicle airbag systems, and more particularly to dynamic control of vehicle airbag systems.

2. Description of the Related Art

An airbag is a vehicle occupant-restraint system using a bag designed to inflate extremely quickly, then quickly deflate during a collision. The airbag consists of the airbag cushion, a flexible fabric bag, an inflation module, and an impact sensor. The purpose of the airbag is to provide a vehicle occupant a soft cushioning and restraint during a crash event. Airbags can reduce injuries between the flailing occupant and the interior of the vehicle. Generally, each airbag is a customized static design that activates with a preset force intended for a worst-case scenarios where the airbag must be fully inflated very quickly to absorb a large amount of momentum transferred from the occupant. Occupants can be injured by the airbag itself due to this rapid inflation.

BRIEF SUMMARY

According to aspects of the present disclosure, an adaptive force vehicle airbag (AFVA) system includes one or more airbags stowed in a compressed state within an interior of a vehicle in a selected one of: (i) in front of; and (ii) beside a vehicle seat. The AFVA system includes an impact sensor that detects a change in motion of the vehicle indicative of a collision. One or more selectable force gas generators (SFGGs) each include more than one gas-generating propellant cells that are individually fired. Each SFGG includes one or more conduits that receive gas from fired gas-generating propellant cells and direct the gas to inflate at least one of the one or more airbags. A controller is communicatively coupled to the inflation initiating component and the more than one gas-generating propellant cells of the one or more SFGGs. The controller enables the AFVA system to: (i) receive an inflation signal from the impact sensor; and (ii) fire a selected number of the more than one gas-generating propellant cells to at least partially inflate the one or more airbags.

According to aspects of the present disclosure, a vehicle includes a vehicle body having an interior and one or more vehicle seats attached to the vehicle body within the interior. An AFVA system includes one or more airbags stowed in a compressed state within the interior of the vehicle in a selected one of: (i) in front of; and (ii) beside a vehicle seat. The AFVA system includes an impact sensor that detects a change in motion of the vehicle indicative of a collision. One or more SFGGs each include more than one gas-generating propellant cells that are individually fired. Each SFGG includes one or more conduits that receive gas from fired gas-generating propellant cells and direct the gas to inflate at least one of the one or more airbags. A controller is communicatively coupled to the inflation initiating component and the more than one gas-generating propellant cells of the one or more SFGGs. The controller enables the AFVA system to: (i) receive an inflation signal from the impact sensor; and (ii) fire a selected number of the more than one gas-generating propellant cells to at least partially inflate the one or more airbags.

According to aspects of the present disclosure, a method is provided for deploying an airbag with adaptive force. In one or more embodiments, the method includes monitoring an impact sensor that detects a change in motion of a vehicle indicative of a collision. The method includes receiving an inflation signal from the impact sensor. The method includes, in response to receiving the inflation signal, selecting a number of more than one gas-generating propellant cells of one or more SFGGs that are pneumatically coupled to one or more airbags that are towed in a compressed state within an interior of the vehicle in a selected one of: (i) in front of; and (ii) beside a vehicle seat. The method includes firing a selected number of more than one gas-generating propellant cells to at least partially inflate at least one of the one or more airbags.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
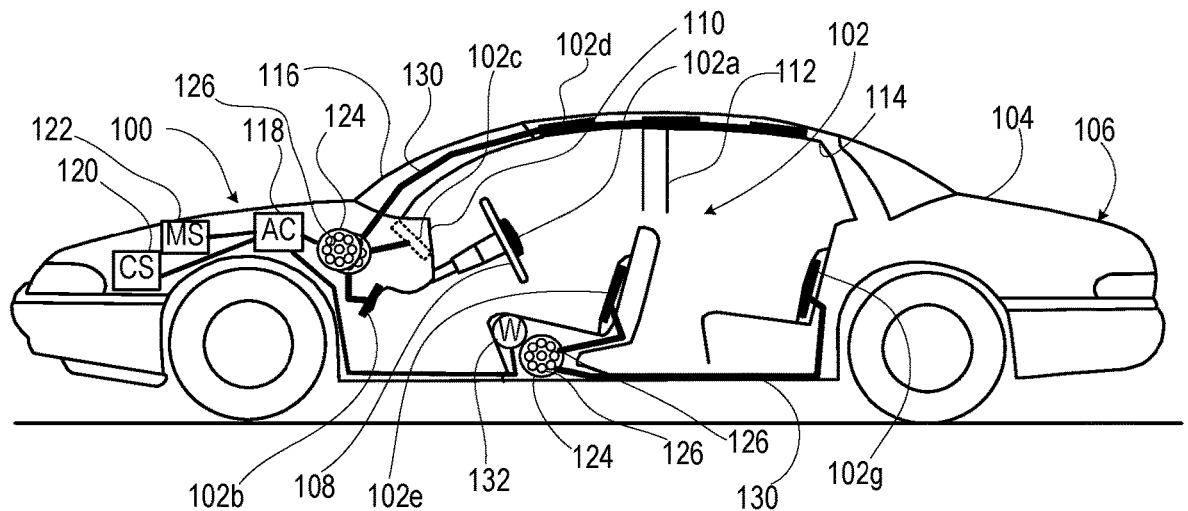
FIG. 1 is a side view of a vehicle having an adaptive force vehicle airbag (AFVA) system, according to one or more embodiments.

FIG. 1 depicts an adaptive force vehicle airbag (AFVA) system 100 having one or airbags, which are generally referred herein as airbag(s) 102, attached in a compressed state on a vehicle body 104 of a vehicle 106. The airbag(s) 102 provides an energy-absorbing surface between occupants of the vehicle 106 and a steering wheel 108, instrument panel 110, body pillar 112, headliner 114, and windshield 116. AFVA system 100 is managed by airbag controller ("AC" or "controller") 118 for providing adaptive force inflation of the airbag(s) 102. An inflation initiating collision sensor 120 is attached to the vehicle 106 to detect a sudden deceleration indicative of a collision. A three-axis motion system 122 can sense additional motion data before and after the collision. One or more selectable force gas generators (SFGGs) 124 each have more than one gas-generating propellant cells 126. The controller 118 individually fires the gas-generating propellant cells 126 to create adaptive amount of inflation to the airbag(s) 102 as directed by one or more conduits 130. Stowed airbag(s) 102 include steering wheel airbag 102a, driver knee airbag 102b, passenger dash airbag 102c, side-curtain airbag 102d, left front seat-mounted airbags 102e, and left rear seat-mounted airbags 102g. Other sensors can include seat weight sensors 132.

Figure 2:
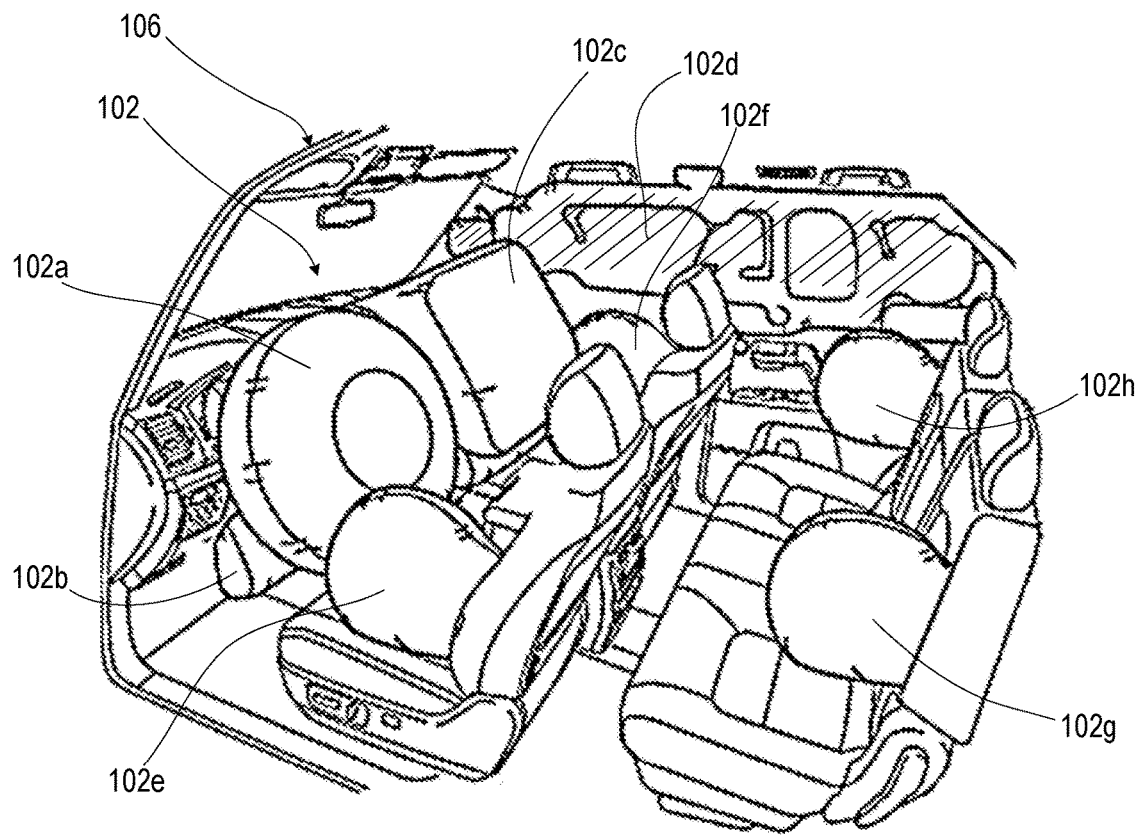
FIG. 2 is a perspective view of an interior of the vehicle after activation of the AFVA system, according to one or more embodiments.

FIG. 2 depicts the vehicle 106 with examples of deployed airbag(s) 102 including the steering wheel airbag 102a, driver knee airbag 102b, passenger dash airbag 102c, side-curtain airbag 102d, left and right front seat-mounted airbags 102e-f, and left and right rear seat-mounted airbags 102g-h. Depicted airbag(s) 102 are illustrative. In one or more embodiments, other locations for airbags 102 can be included, such as seat belt, pillar mounted, etc.

Figure 3A:
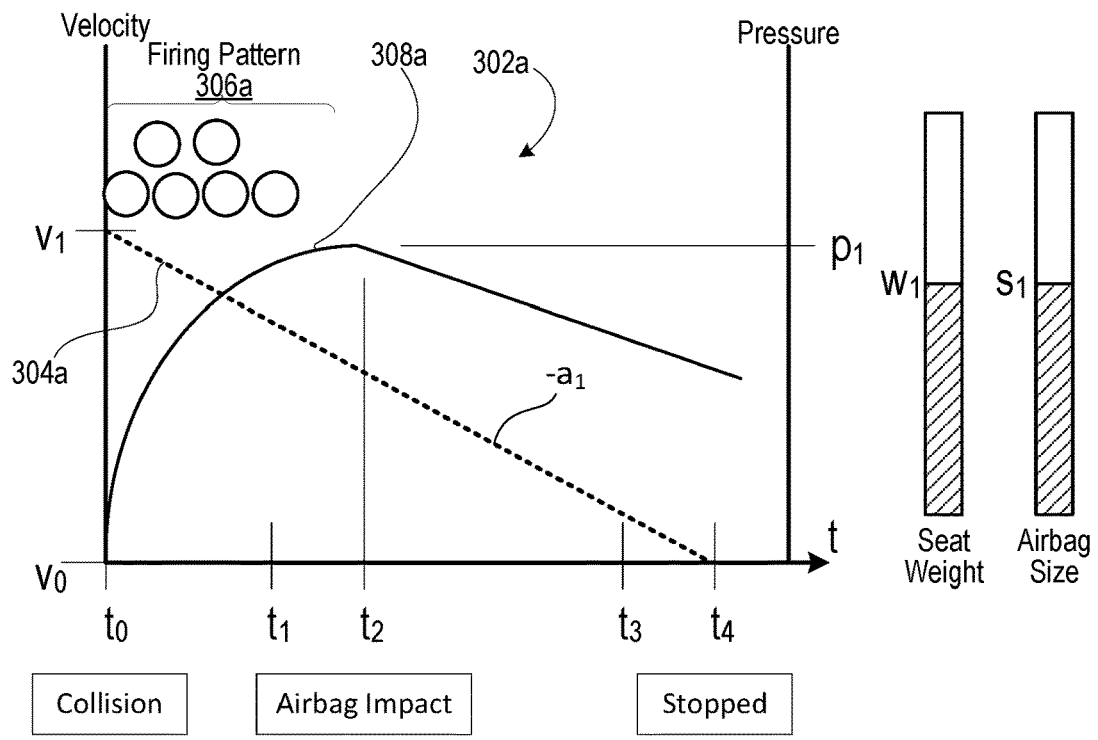
FIG. 3A is a first graphical plot of a first example vehicle deceleration and adaptive force airbag response according to one or more embodiments.
Figure 3B:
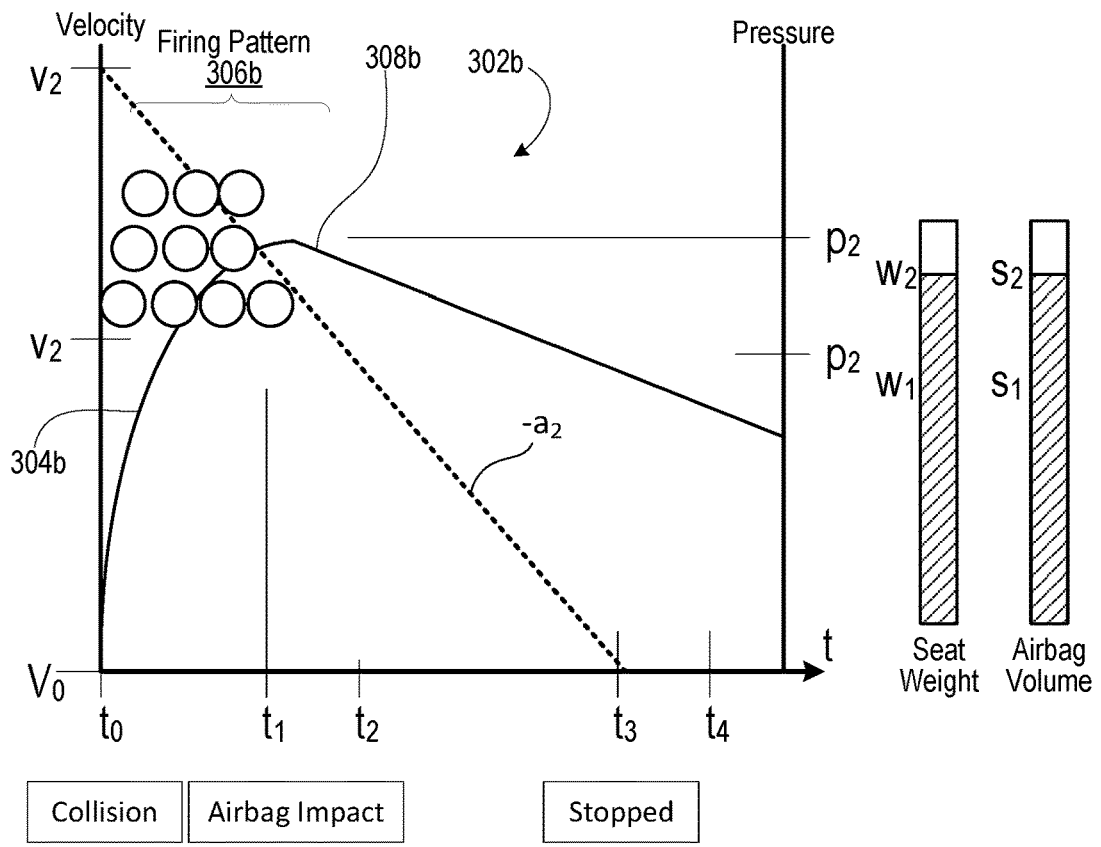
FIG. 3B is a first graphical plot of a second example vehicle deceleration and adaptive force airbag response according to one or more embodiments.

FIGS. 3A-B depict graphical plots 302a, 302b, respectively of adaptive force deployment that is responsive to detected circumstances of a collision over an interval of times $t_0$ to $t_4$ inclusive. In FIG. 3A, a velocity plot 304a begins at $V_1$ at time to when a collision occurs with steady deceleration until fully stopped at time $t_4$. Additional factors include seat weight $w_1$ of the occupant and airbag size $s_1$. In response to these factors, a firing pattern 306a of six (6) gas generators is fired between times $t_0$-$t_1$. Corresponding to the amount of gas generated and size of the airbag, a pressure plot 308a reaches pressure level $p_1$ at time $t_2$ when the occupant impacts the airbag. Then the pressure drops with deflation of the airbag. By contrast, in FIG. 3B, a velocity plot 304b begins at $V_2$ that is greater than $V_1$ at time to when a collision occurs with steady deceleration $-\alpha_2$ that is more rapid than $-\alpha_1$ until fully stopped at time $t_3$ that is sooner than $t_4$. Additional factors include seat weight $w_2$ of an occupant that is greater than $w_1$ and airbag size $\Omega$ that is greater than $s_1$. In response to these factors, a firing pattern 306a often (10) gas generators is fired between times $t_0$-$t_1$. Corresponding to the amount of gas generated and size of the airbag, a pressure plot 308b reaches pressure level $p_2$ that is greater than $p_1$ at time $t_1$ when the occupant impacts the airbag. Then the pressure drops with deflation of the airbag. The response adapts to a greater inflation volume, greater pressure and more rapid inflation requirement of a more challenging collision scenario.

Figure 4:
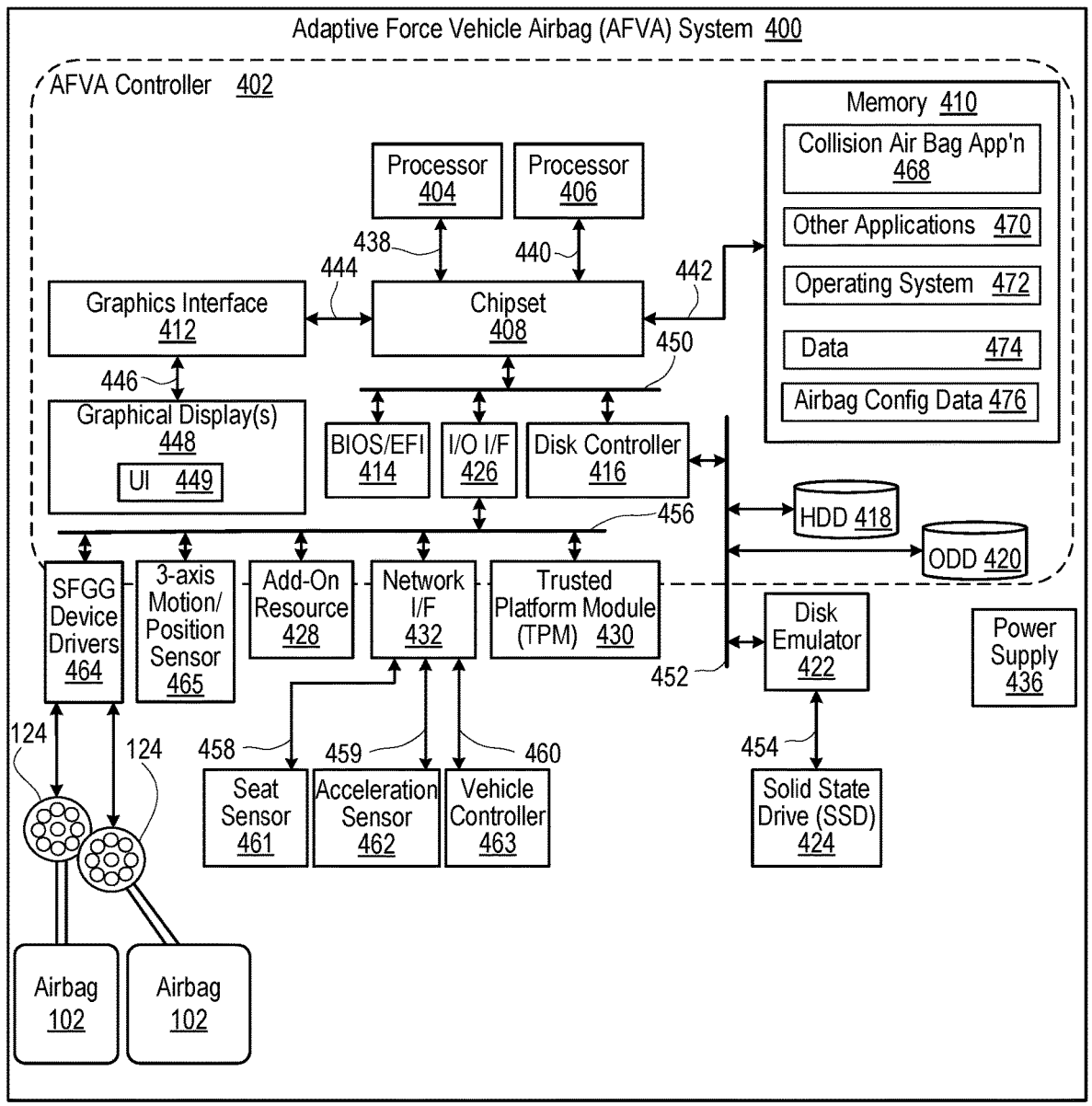
FIG. 4 is a diagrammatic illustration of an exemplary hardware and software environment of the AFVA system, according to one or more embodiments.

FIG. 4 is a diagrammatic illustration of an exemplary hardware and software environment of an AFVA system 400, such as AFVA system 100 (FIG. 1), customized to implement an AFVA controller 402 consistent with embodiments of the innovation. AFVA system 400 is in part a customized information handling system (IHS) 100 that performs at least a part of the methodologies and features as described herein. AFVA system 400 can include processing resources for executing machine-executable code, such as a central processing unit (CPU), a programmable logic array (PLA), an embedded device such as a System-on-a-Chip (SoC), or other control logic hardware. AFVA system 400 can also include one or more computer-readable medium for storing machine-executable code, such as software or data. Additional components of AFVA system 400 can include one or more storage devices that can store machine-executable code, one or more communications ports for communicating with external devices, and various input and output (I/O) devices, such as a keyboard, a mouse, and a video display. AFVA system 400 can also include one or more interconnects or buses operable to transmit information between the various hardware components.

AFVA system 400 includes processors 404 and 406, chipset 408, memory 410, graphics interface 412, a basic input and output system/extensible firmware interface (BIOS/EFI) module 414, disk controller 416, hard disk drive (HDD) 418, optical disk drive (ODD) 420, disk emulator 422 connected to an external solid state drive (SSD) 424, input/output (I/O) interface (I/F) 426, one or more add-on resources 428, a trusted platform module (TPM) 430, network interface 432, and power supply 436. Processors 404 and 406, chipset 408, memory 410, graphics interface 412, BIOS/EFI module 414, disk controller 416, HDD 418, ODD 420, disk emulator 422, SSD 424, I/O interface 426, add-on resources 428, TPM 430, and network interface 432 operate together to provide a host environment of AFVA system 400 that operates to provide the data processing functionality of the information handling system. The host environment operates to execute machine-executable code, including platform BIOS/EFI code, device firmware, operating system code, applications, programs, and the like, to perform the data processing tasks associated with AFVA system 400.

In a host environment, processor 404 is connected to chipset 408 via processor interface 438, and processor 406 is connected to the chipset 408 via processor interface 440. Memory 410 is connected to chipset 408 via a memory bus 442. Graphics interface 412 is connected to chipset 408 via a graphics bus 444, and provides a video display output 446 to graphical display(s) 448 that presents UI 449. In a particular embodiment, AFVA system 400 includes separate memories that are dedicated to each of processors 404 and 406 via separate memory interfaces. An example of memory 410 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 414, disk controller 416, and I/O interface 426 are connected to chipset 408 via an I/O channel 450. An example of I/O channel 450 includes a Peripheral Component Interconnect (PCI) interface, a PCI-Extended (PCI-X) interface, a high speed PCI-Express (PCIe) interface, another industry standard or proprietary communication interface, or a combination thereof. Chipset 408 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 414 includes BIOS/EFI code operable to detect resources within AFVA system 400, to provide drivers for the resources, initialize the resources, and access the resources. BIOS/EFI module 414 includes code that operates to detect resources within AFVA system 400, to provide drivers for the resources, to initialize the resources, and to access the resources.

Disk controller 416 includes a disk interface 452 that connects the disk controller to HDD 418, to ODD 420, and to disk emulator 422. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 422 permits SSD 424 to be connected to AFVA system 400 via an external interface 454. An example of external interface 454 includes a USB interface, an IEEE 1394 (Firewire) interface, a proprietary interface, or a combination thereof. Alternatively, solid-state drive 424 can be disposed within AFVA system 400.

I/O interface 426 includes a peripheral interface 456 that connects the I/O interface to add-on resource 428, to TPM 430, and to network interface 432. Peripheral interface 456 can be the same type of interface as I/O channel 442, or can be a different type of interface. As such, I/O interface 426 extends the capacity of I/O channel 442 when peripheral interface 456 and the I/O channel are of the same type, and the I/O interface translates information from a format suitable to the I/O channel to a format suitable to the peripheral channel 456 when they are of a different type. Add-on resource 428 can include a data storage system, an additional graphics interface, a network interface card (NIC), a sound/video processing card, another add-on resource, or a combination thereof. Add-on resource 428 can be on a main circuit board, on separate circuit board or add-in card disposed within AFVA system 400, a device that is external to the information handling system, or a combination thereof.

Network interface 432 represents a network interface controller (NIC) disposed within AFVA system 400, on a main circuit board of the information handling system, integrated onto another component such as chipset 408, in another suitable location, or a combination thereof. Network interface 432 includes network channels 458, 459 and 460 that provide interfaces to devices that are external to AFVA system 400. In a particular embodiment, network channels 458 and 460 are of a different type than peripheral channel 456 and network interface 432 translates information from a format suitable to the peripheral channel to a format suitable to external devices. An example of network channels 458-460 includes InfiniBand channels, Fibre Channel channels, Gigabit Ethernet channels, proprietary channel architectures, or a combination thereof. Network channels 458-460 can be connected to external network resources such as a seat weight sensor 461, collision accelerometer sensor 462, and a vehicle controller 463. The network resource can include another information handling system, a data storage system, another network, a grid management system, another suitable resource, or a combination thereof. SFGG device drivers 464 can generate firing signals that trigger SFGGs 124 to inflate airbags 102. Three axis motion and position sensor 465 indicates orientation and motion of the vehicle 106 (FIG. 1).

Within memory 410, HDD 418, ODD 420, or SSD 424, one or more software and/or firmware modules and one or more sets of data can be stored that can be utilized during operations of AFVA system 400. These one or more software and/or firmware modules can be loaded into memory 410 during operation of the AFVA system 400. Specifically, in one embodiment, memory 410 can include therein a plurality of such modules, including an AFVA application 468, one or more other applications 470, operating system (OS) 472, and data 474. One example of data is airbag configuration data 476 These software and/or firmware modules have varying functionality as disclosed herein when their corresponding program code is executed by processors 404, 406.

Figure 5:
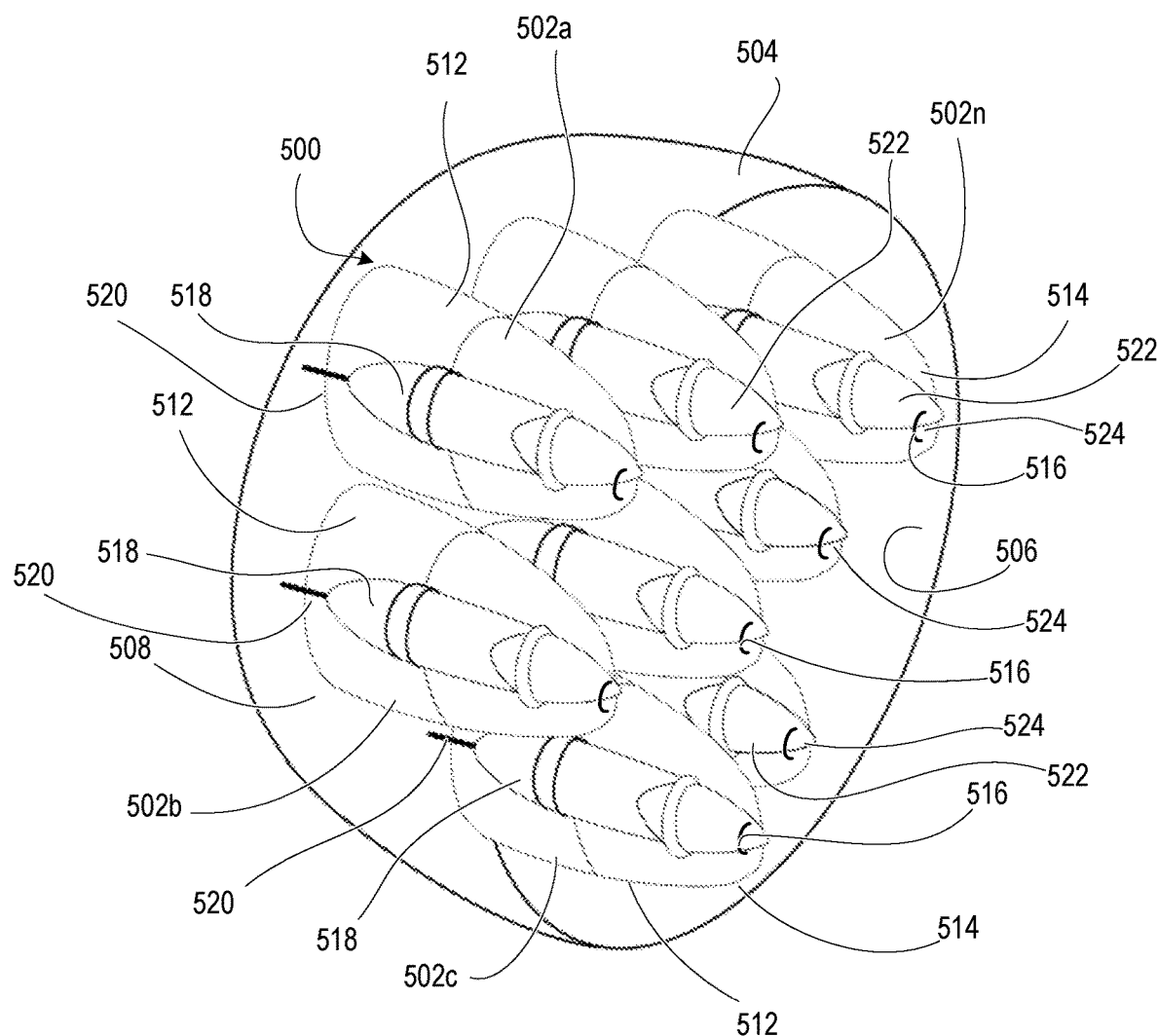
FIG. 5 is perspective view of an SFGG that enables selecting a pattern of firing of gas generating propellant shells for a desired peak and duration of gas pressure, according to one or more embodiments.

FIG. 5 is perspective view of a selectable force gas generator (SFGG) 500 that enables selecting a pattern of firing of gas generating propellant shells 502 a 502n for a desired peak and duration of gas pressure. A housing 504 is attachable to an ejector mechanism of an airborne store support assembly of an aircraft (not shown). The housing 504 contains a gas collection chamber 506. Honeycomb structure 508 provides support material that is contained in the housing 504 adjacent to the gas collection chamber 506. Gas-generating propellant cells 502a 502n are partially embedded in the honeycomb structure 508. Honeycomb structure 508 provides a light weight option for airborne applications, although other support materials may be used.

Each gas-generating propellant cell 502 a 502n includes a steel jacket 512 having a convex portion 514 exposed to the gas collection chamber 506. The steel jacket 512 has a thickness sufficient to withstand increased outer pressure from initiation of another gas-generating propellant cell 502 a 502n. Steel is an example of a strong material that resists sympathetic detonation but other materials may be used according to aspects of the present disclosure. The steel jacket 512 includes an orifice 516 through the convex portion 514. A propellant packet 518 is contained in the steel jacket 512. A fire wire 520 is electrically connectable to an electrically-fired initiator (not shown). The fire wire 520 is electrically connected to the propellant packet 518. The fire wire 520 transmits a firing signal that causes the propellant packet 518 to rapidly produce gas. A cap 522 is positioned between the propellant packet 518 and the steel jacket 512. The cap 522 has a tip 524 that blocks the orifice 516 of the steel jacket 512 from increased outer pressure in the gas collection chamber 506 to prevent sympathetic detonation of the propellant packet 518.

Figure 6:
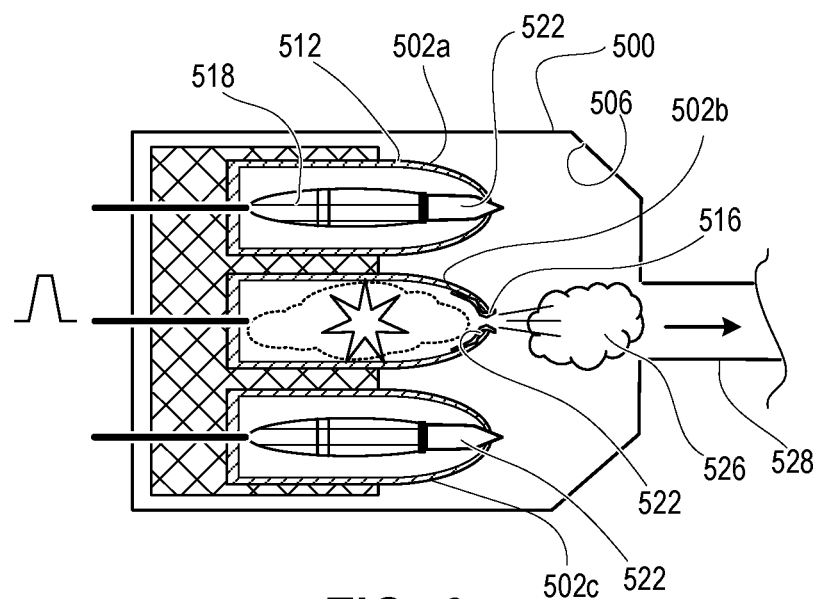
FIG. 6 is a simplified diagrammatic view of the SFGG of FIG. 5 with one gas generator firing without sympathetic firing by two unfired gas generators, according to one or more embodiments.
Figure 7:
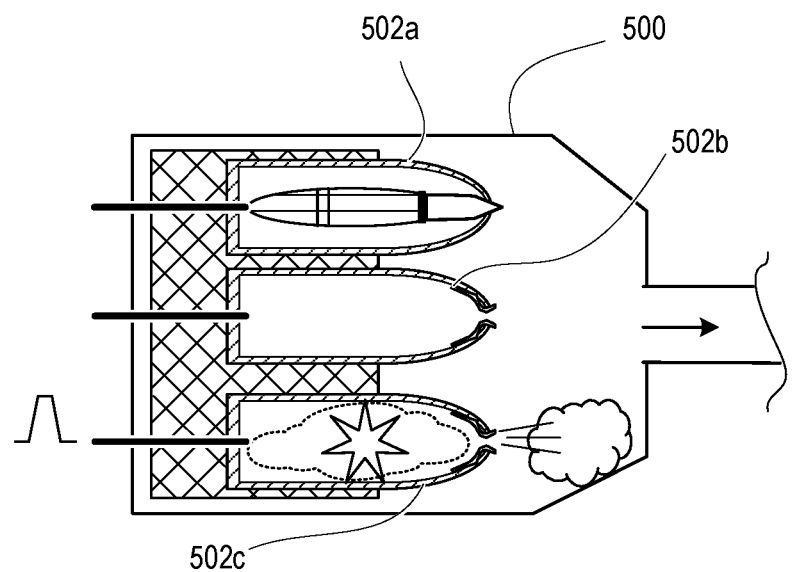
FIG. 7 is a simplified diagrammatic view of the SFGG of FIG. 6 with a second gas generator firing without sympathetic firing by the remaining unfired gas generator, according to one or more embodiments.

FIG. 6 depicts the SFGG 500 having gas-generating propellant cell 502 a 502c with one gas-generating propellant cell 502b firing. Cap 522 is ruptured and/or orifice 516 is expanded by increased gas pressure internal to steel jacket 512, allowing gas 526 to enter gas collection chamber 506 and to be guided by gas conduit 528 to an ejection mechanism (not shown). Adjacent gas-generating propellant cells 502 a, 502c do not fire due to sympathetic detonation. FIG. 7 depicts the SFGG 500 with gas-generating propellant cell 502b fully expended. Gas-generating propellant cell 502c is firing without causing sympathetic detonation of gas-generating propellant cell 502a.

Figure 8:
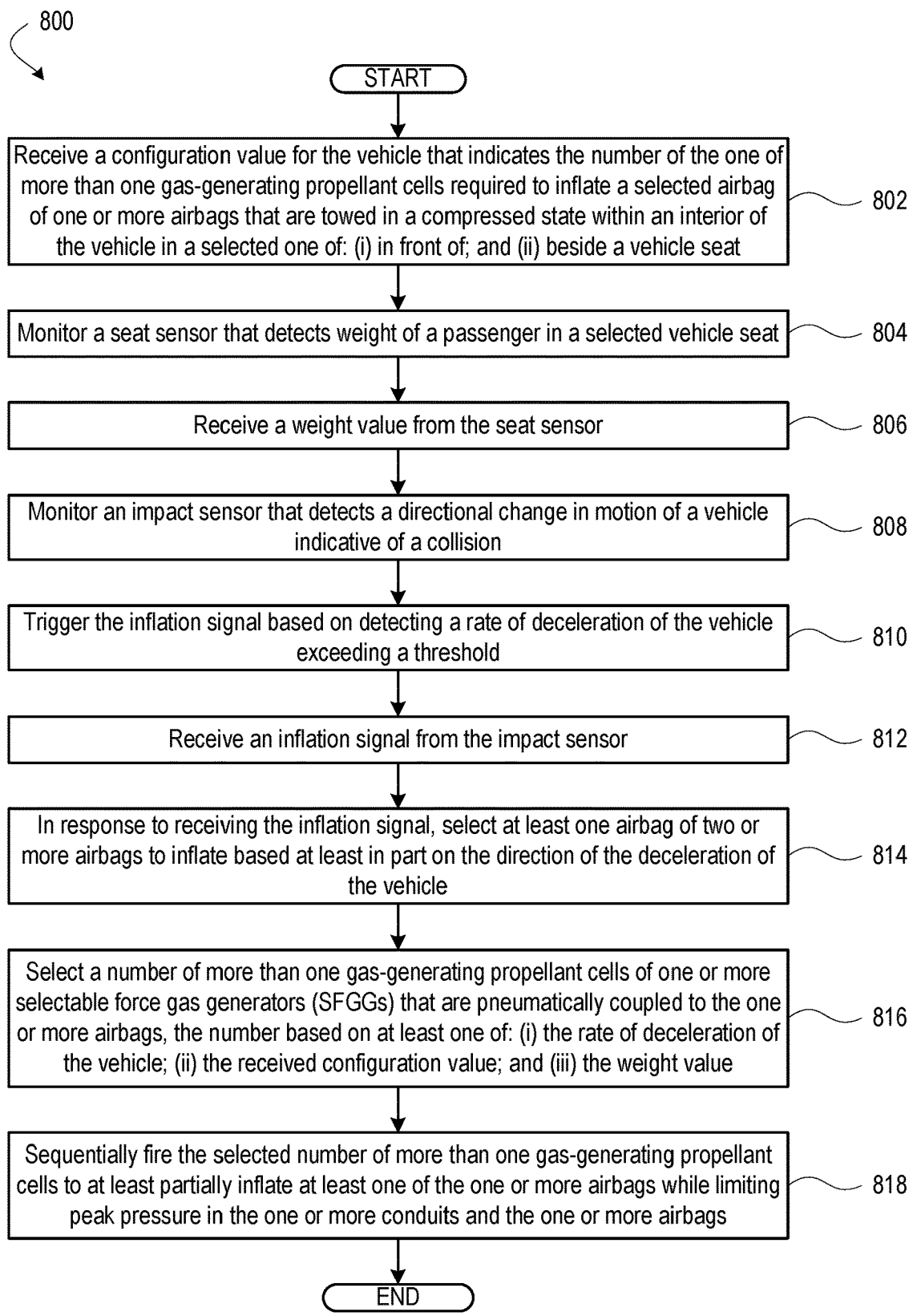
FIG. 8 is a flow diagram of a method for deploying a vehicle airbag system with an amount of force adapted to the circumstances, according to one or more embodiments.

FIG. 8 depicts a flow diagram of a method 800 for deploying a vehicle airbag system with an amount of force adapted to the circumstances. The method 800 includes receiving a configuration value for the vehicle that indicates the number of the one of more than one gas-generating propellant cells required to inflate a selected airbag of one or more airbags that are towed in a compressed state within an interior of the vehicle in a selected one of: (i) in front of; and (ii) beside a vehicle seat (block 802). The method 800 includes monitoring a seat sensor that detects weight of a passenger in a selected vehicle seat (block 804). The method 800 includes receiving a weight value from the seat sensor (block 806). The method 800 includes monitoring an impact sensor that detects a directional change in motion of a vehicle indicative of a collision (block 808). The method 800 includes triggering the inflation signal based on detecting a rate of deceleration of the vehicle exceeding a threshold (block 810). The method 800 includes receiving an inflation signal from the impact sensor (block 812). In response to receiving the inflation signal, the method 800 includes selecting at least one airbag of two or more airbags to inflate based at least in part on the direction of the deceleration of the vehicle (block 814). The method 800 includes selecting a number of more than one gas-generating propellant cells of one or more selectable force gas generators (SFGGs) that are pneumatically coupled to the one or more airbags, the number based on at least one of: (i) the rate of deceleration of the vehicle; (ii) the received configuration value; and (iii) the weight value (block 816). The method 800 includes sequentially firing the selected number of more than one gas-generating propellant cells to at least partially inflate at least one of the one or more airbags while limiting peak pressure in the one or more conduits and the one or more airbags (block 818). Then method 800 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An adaptive force vehicle airbag (AFVA) system comprising:
    at least one airbag stowed in a compressed state within an interior of a vehicle near at least one vehicle seat;
    an impact sensor that detects a change in motion of the vehicle indicative of a collision;
    at least one selectable force gas generator (SFGG) separated from the at least one airbag and comprising a housing containing a gas collection chamber and more than one gas-generating propellant cells that are individually fired to produce a selected amount of gas within the gas collection chamber;

at least one gas conduit connecting the gas collection chamber of the at least one SFGG to the at least one airbag that receives gas from fired gas-generating propellant cells within the gas collection chamber and directs the gas to inflate the at least one airbag; and a controller communicatively coupled to the impact sensor and the more than one gas-generating propellant cells of the at least one SFGG, the controller enabling the AFVA system to:

receive an inflation signal from the impact sensor; and fire a selected number of the more than one gas-generating propellant cells to at least partially inflate the one or more airbags.

2. The AFVA system of claim 1, wherein:
the impact sensor detects a rate of deceleration of the vehicle; and
the controller selects the number of the more than one gas-generating propellant cells based at least in part on the rate of deceleration of the vehicle.

3. The AFVA system of claim 2, wherein:
the impact sensor detects a direction of the deceleration of the vehicle; and
the controller selects one of two or more of the at least one airbag to inflate based at least in part on the direction of the deceleration of the vehicle.

4. The AFVA system of claim 1, wherein the controller enables the AFVA system to:
receive a configuration value for the vehicle that indicates the number of the one of more than one gas-generating propellant cells required to inflate a selected one of the at least one airbag; and
select the number of the more than one gas-generating propellant cells based at least in part on the received configuration value.

5. The AFVA system of claim 1, wherein the controller enables the AFVA system to:
monitor a seat sensor that detects weight of a passenger in a selected one of the at least one vehicle seat;
receive a weight value from the seat sensor; and
select the number of the more than one gas-generating propellant cells based at least in part on the weight value.

6. The AFVA system of claim 1, wherein the controller selects the number of the more than one gas-generating propellant cells to sequentially fire based at least in part on limiting peak pressure in the at least one gas conduit and the at least one airbag.

7. The AFVA system of claim 1, wherein the at least one SFGG comprises support material contained in the housing adjacent to the gas collection chamber, wherein the more than one gas-generating propellant cells are partially embedded in the support material, and each of the more than one gas-generating propellant cells comprising:
a jacket of material having a convex portion exposed to the gas collection chamber, having a thickness sufficient to withstand increased outer pressure from initiation of another gas-generating propellant cell, and including an orifice through the convex portion,
a propellant packet contained in the jacket;
a fire wire electrically connectable to an electrically-fired initiator and electrically connected to the propellant packet, the fire wire transmitting a firing signal that causes the propellant packet to produce gas, and
a cap positioned between the propellant packet and the jacket and having a tip that blocks the orifice of the jacket from increased outer pressure in the gas collection chamber to prevent sympathetic detonation of the propellant packet.

8. A vehicle comprising:
a vehicle body having an interior; and
one or more vehicle seats attached to the vehicle body within the interior;
an adaptive force vehicle airbag (AFVA) system comprising:
at least one air bag stowed in a compressed state within the interior of the vehicle near at least one of the vehicle seats;
an impact sensor that detects a change in motion of the vehicle indicative of a collision;
at least one selectable force gas generator (SFGG) separated from the at least one airbag and comprising a housing containing a gas collection chamber, and more than one gas-generating propellant cells that are individually fired to produce a selected amount of gas within the gas collection chamber;
at least one gas conduit connecting the gas collection chamber of the at least one SFGG to the at least one airbag that receives gas from fired gas-generating propellant cells within the gas collection chamber and directs the gas to inflate the at least one airbag; and
a controller communicatively coupled to the impact sensor and the more than one gas-generating propellant cells of the one or more SFGGs, the controller enabling the AFVA system to:
receive an inflation signal from the impact sensor; and
fire a selected number of the more than one gas-generating propellant cells to at least partially inflate the one or more airbags.

9. The vehicle of claim 8, wherein:
the impact sensor detects a rate of deceleration of the vehicle; and
the controller selects the number of the more than one gas-generating propellant cells based at least in part on the rate of deceleration of the vehicle.

10. The vehicle of claim 9, wherein:
the impact sensor detects a direction of the deceleration of the vehicle; and
the controller selects one of two or more of the at least one airbag to inflate based at least in part on the direction of the deceleration of the vehicle.

11. The vehicle of claim 8, wherein the controller enables the vehicle to:
receive a configuration value for the vehicle that indicates the number of the one of more than one gas-generating propellant cells required to inflate a selected one the at least one airbag; and
select the number of the more than one gas-generating propellant cells based at least in part on the received configuration value.

12. The vehicle of claim 1, wherein the controller enables the vehicle to:
monitor a seat sensor that detects weight of a passenger in a selected one of the vehicle seats;
receive a weight value from the seat sensor; and
select the number of the more than one gas-generating propellant cells based at least in part on the weight value.

13. The vehicle of claim 8, wherein the controller selects the number of the more than one gas-generating propellant cells to sequentially fire based at least in part on limiting peak pressure in the at least one gas conduit and the at least one airbag.

14. The vehicle of claim 8, wherein
each of the more than one gas-generating propellant cells comprises:
a jacket of material having a convex portion exposed to the gas collection chamber, having a thickness sufficient to withstand increased outer pressure from initiation of another gas-generating propellant cell, and including an orifice through the convex portion,
a propellant packet contained in the jacket;
a fire wire electrically connectable to an electrically-fired initiator and electrically connected to the propellant packet, the fire wire transmitting a firing signal that causes the propellant packet to produce gas, and
a cap positioned between the propellant packet and the jacket and having a tip that blocks the orifice of the jacket from increased outer pressure in the gas collection chamber to prevent sympathetic detonation of the propellant packet.

15. A method comprising:
monitoring an impact sensor that detects a change in motion of a vehicle indicative of a collision;
receiving an inflation signal from the impact sensor;
in response to receiving the inflation signal:
selecting a number of more than one gas-generating propellant cells of at least one selectable force gas generator (SFGG) that is pneumatically coupled to at least one air bag that is stowed in a compressed state within an interior of the vehicle near at least one vehicle seat;
wherein the at least one selectable force gas generator (SFGG) is separated from the at least one airbag and comprises:
a housing containing a gas collection chamber; and
the more than one gas-generating propellant cells that are individually fired; and
wherein at least one gas conduit connects the gas collection chamber of the at least one SFGG to the at least one airbag that receives gas from fired gas-generating propellant cells within the gas collection chamber and directs the gas to inflate the at least one airbag; and
firing a selected number of the more than one gas-generating propellant cells to at least partially inflate at least one of the at least one airbag.

16. The method of claim 15, further comprising:
triggering the inflation signal based on detecting a rate of deceleration of the vehicle exceeding a threshold; and
selecting the number of the more than one gas-generating propellant cells based at least in part on the rate of deceleration of the vehicle.

17. The method of claim 16, further comprising:
detecting a direction of the deceleration of the vehicle; and
selecting one of two or more of the at least one airbag to inflate based at least in part on the direction of the deceleration of the vehicle.

18. The method of claim 15, further comprising:
receiving a configuration value for the vehicle that indicates the number of the one of more than one gas-generating propellant cells required to inflate a selected one of the at least one airbag; and
selecting the number of the more than one gas-generating propellant cells based at least in part on the received configuration value.

19. The method of claim 15, further comprising:
monitoring a seat sensor that detects weight of a passenger in a selected one of the vehicle seats;
receiving a weight value from the seat sensor; and
selecting the number of the more than one gas-generating propellant cells based at least in part on the weight value.

20. The method of claim 15, further comprising selecting the number of the more than one gas-generating propellant cells to sequentially fire based at least in part on limiting peak pressure in the at least one gas conduit and the at least one airbag.

* * * * *